Feb. 23, 1965   L. RAVICH   3,170,252
LAMINATED SHOE COUNTER AND METHOD OF MAKING
Filed Jan. 12, 1961

INVENTOR.
Louis Ravich
BY
Ezekiel Wolf, Wolf + Greenfield.
ATTORNEYS

United States Patent Office 3,170,252
Patented Feb. 23, 1965

3,170,252
LAMINATED SHOE COUNTER AND
METHOD OF MAKING
Louis Ravich, Marblehead, Mass., assignor, by mesne assignments, to Colonial Tanning Co., Inc., Boston, Mass.
Filed Jan. 12, 1961, Ser. No. 82,278
7 Claims. (Cl. 36—68)

The present invention relates to a means and method of making an improved shoe lining and/or counter having a sueded flocked non-slip surface with latent stiffening properties for imparting stiffness to the counter or other parts of the shoe upper.

The present invention is an improvement over the structure and process disclosed in United States Letters Patent 2,619,441, issued to H. C. Levy on November 25, 1952. Heretofore, numerous problems have arisen in connection with the manufacture of sueded quarter linings of the type described in that patent. It is difficult following the process described in that patent, to consistently manufacture a commercially acceptable product at competitive costs. It is, therefore, an object of the present invention to provide a method by which a commercially acceptable product may be manufactured consistently at competitive costs. It is also an object of the present invention to provide a shoe lining and counter of improved construction which may be made easily and inexpensively.

In the present invention there is provided a laminated unitary shoe lining and counter material having self-stiffening properties which comprises a foundation ply formed of a fibrous or textile fabric sheet impregnated with a thermosoftening resin such as polyvinyl acetate. On one side of this foundation ply is a layer of a heat activatable adhesive compound. On the other side of the foundation ply are successive adjacent layers of a thermosoftening film forming material preferably polyvinyl acetate, and latex or the equivalent, and another sheet of flocked or sueded material.

This laminated construction is made by impregnating a foundation ply formed of fibrous or woven textile fabric sheets with polyvinyl acetate. The impregnated foundation ply is then dried. A sheet of sueded or flocked material is then prepared by available conventional or commercial processes. This flocked sheet is then coated on its unflocked side with a thin layer of latex and then dried. The foundation ply and flocked sheet carrying the layer of latex are then combined into a laminated construction with an intermediate layer of polyvinyl acetate between the latex layer and the foundation ply. The laminate unitary construction is dried and subsequently rolled or cut.

These and other objects and advantages of the present invention will be more clearly understood when considered in conjunction with the accompanying drawings in which.

Figure 1:
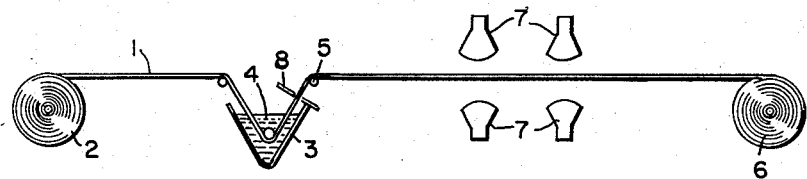
FIGS. 1, 2 and 3 are schematic illustrations of steps in the manufacture of the laminated unitary shoe lining in a preferred form.

A preferred foundation ply 1 may be conveniently prepared from a single sheet of double napped flannel of desired weight and width which may, for example, weigh 3.90 yards per pound and have a width of 44 inches. The flannel foundation ply 1 is saturated or impregnated with a polyvinyl acetate emulsion by conveniently passing it from a roll 2 into a tank 3 containing the polyvinyl acetate emulsion 4 and thence over suitable rolls 5 to a take up roll 6. The impregnated foundation ply is dried by passing it about steam heated drums and/or banks of infra-red lamps 7 before it is taken up on the take up roll 6.

If desired, suitable doctor rolls or other means indicated at 8 may be used to limit the thickness of the impregnating polyvinyl acetate.

The rate of which the foundation ply can be prepared is dependent upon its rate of drying and, therefore, the take up speed must be adjusted so that a dry product emerges.

Figure 2:
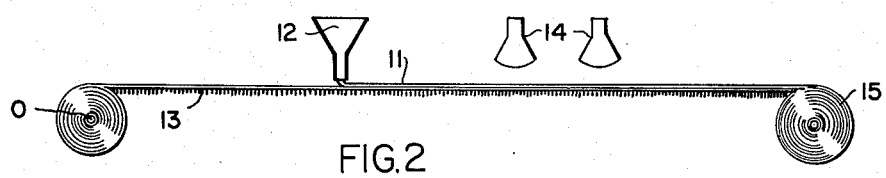

The sheet of sueded or flocked cloth material may be prepared by any convenient or commercial process available as for example by the process disclosed in United States Letters Patent No. 2,173,032 Sept. 12, 1939, issued to Wintermute and referred to in the Levy Patent 2,619,-441, supra. The sueded cloth material as prepared, comprises a sheet of fabric material having adhered to it, on one surface, a pile forming fabric made up of short fiber staples preferably not over an eighth of an inch in length. This sheet of sueded cloth material is unwound from a roll such as illustrated at 10 in FIG. 2, and has applied to the surface opposite the sueded surface a thin layer of latex 11 which may be supplied from a hopper 12, schematically illustrated. Suitable control means may be utilized to assure that a thin layer of latex sufficient to cover the entire surface is applied. The thickness may be as thin as possible consistent with a complete covering of the sueded sheet 13. The latex layer 11 is dried by a bank of infra-red lamps 14 or other suitable means and the latex coated sheet is then rolled on roller 15.

The sueded or flocked fabric sheet 13 having a layer of latex adhered on one side and a sueded appearance on the other is now combined with the foundation ply 1 to produce the laminated unitary self-stiffening quarter lining of this invention. The sueded sheet 13 is unwound from a roll, preferably with the flocked surface facing downwardly, over suitable guide rolls such as illustrated at 16. On the side opposite the flocked surface is applied a thin layer 17 of polyvinyl acetate which may be supplied from a hopper 18 with the thickness suitably controlled by the doctor bar 19. After application of the thin layer of polyvinyl acetate and before the application of any heat or pressure, the foundation ply 1 is applied to the polyvinyl acetate layer 17. The foundation ply 1 is fed from a roll 20 over suitable guide rolls 21 into facing relation with the polyvinyl acetate layer 17. Suitable squeeze rolls 22 pressure the composition together prior to its passage through suitable heating means which may comprise banks of infra-red lamps 23. These banks 23 dry the various layers and ply and cause them to adhere one to another, thereby forming a laminated unitary lining which is then rolled onto a roll 24 or is cut into sheet form by convenient suitable means.

Figure 4:
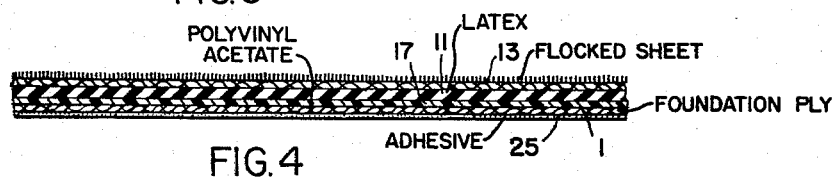
FIG. 4 is a schematic cross-sectional view of a preferred form of the laminate lining.

The preferred lining is illustrated in FIG. 4. In this arrangement, as schematically illustrated a single or double napped flannel foundation ply 1 is preferably impregnated with polyvinyl acetate. As indicated, this may be made of any fibrous or textile fabric sheet having properties adapted to absorb the polyvinyl acetate. A heat activatable adhesive layer 25 is applied to the outer surface of the foundation ply 1. This adhesive may be of the type described in the Levy Patent 2,619,441. On the other side of the foundation ply 1 is a layer of polyvinyl acetate 17 adjacent to which there is a layer of latex 11 with an outer laminate of the flocked or sueded sheet 13.

Figure 3:
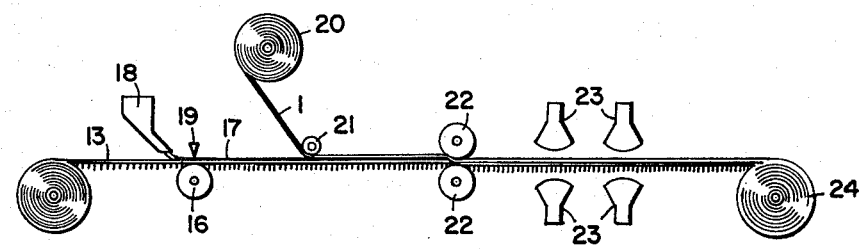
Figure 5:
FIGS. 5 and 6 are modifications of the laminated lining illustrated in FIG. 4.

An alternate form of the invention is illustrated in FIG. 5 wherein flocking material is applied directly to the latex laminate 11. In the manufacture of such composition, the foundation ply is prepared as previously described. To this foundation ply there is applied a layer of polyvinyl acetate in a manner described in connection with the description of FIG. 3. After the application of this polyvinyl acetate layer, the layer is dried and a second layer of latex is applied. While this layer is still tacky, the flocking is applied directly in a conventional manner.

The composition made in accordance with this invention may be used in accordance with ordinary shoe making processes. Shapes cut from the laminated material may be conveniently stitched like any other linings upon its margins to the outer integuments of a shoe upper to form a lined counter. The combined parts of the upper are then heated to render the laminated material moldable, and when the foundation carries an adhesive coating, to activate that adhesive. Heating may conventionally be done in heaters similar to conventional box toe heaters or adaptations thereof. The upper thus assembled is then placed upon the last and pulled over in a conventional manner and subsequently lasted, thereby conforming the softened counter portion to the contour of the heel end of the last and securing adhesively the outer integument to the lined counter. In addition to a very substantial saving in shoe making costs the improved lined counter of this invention materially improves the appearance of the inside of the counter portion of the shoe imparting to it a smooth and clean effect and provides a non-slipping suede surface when engaged with the wearer's foot.

Figure 6:
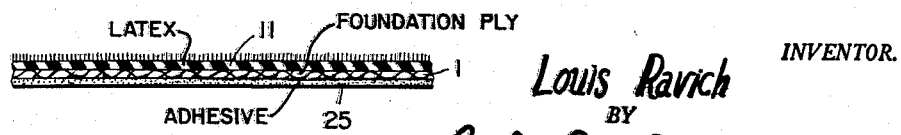

FIG. 6 illustrates a cross-section similar to FIG. 5 of an alternate modification of the invention. In the modification the foundation ply 1 is impregnated with a polyvinyl acetate emulsion as previously indicated. After the ply 1 has been dried it is coated on one side with a thin layer of latex 11. Befor the latex is dried its surface is covered with short staple fibers 11 forming a sueded surface as previously described. If desired a preformed sheet of fabric having a sueded surface may be laminated to the wet latex layer. An adhesive layer 25 may be coated on the other side of ply 1.

In a further alternate process the flocked fabric sheet 13 is coated with an adhesive such as latex. While the latex is still wet the impregnated foundation ply 1 having a dried layer of polyvinyl acetate, already applied, is laminated so that the wet adhesive will come in face to face contact with the dried layer of polyvinyl acetate. The layer of adhesive is then dried to bond the foundation ply 1 to the flocked sheet 13.

Having now described my invention, I claim:

1. A laminated unitary shoe counter having self-stiffening properties comprising a fibrous foundation ply internally impregnated with polyvinyl acetate, a sheet having a single flocked surface on one side and a layer of latex on the other side, and an intermediate layer of polyvinyl acetate adhesively uniting said layer of latex and said foundation ply.

2. A lamination as set forth in claim 1 wherein said foundation ply has a heat activatable adhesive layer on the outer side adapted to secure said lining to the outer integument of the upper of a shoe when heated.

3. A laminated unitary shoe counter having self-stiffening properties comprising a foundation ply of a fabric saturated and impregnated with a polyvinyl acetate emulsion, a layer of said polyvinyl acetate emulsion adhered to said foundation ply, a layer of latex adhered to said layer of said polyvinyl acetate emulsion, and a surface layer having an outwardly faced flocked surface adhered to said layer of latex.

4. A method of making a laminated unitary shoe lining material having self-stiffening properties comprising forming a foundation ply of fabric material impregnated with polyvinyl acetate emulsion and drying said foundation ply, forming a sheet having a flocked surface on one side and a layer of latex on the other side and drying said sheet, and laminating said flocked sheet and foundation ply under the influence of heat and pressure with an intermediate layer of a polyvinyl acetate emulsion having stiffening and adhesive properties.

5. A method as set forth in claim 4 wherein a coat of a heat activatable adhesive is applied to the outer side of said foundation ply after said impregnation and drying.

6. A formable laminated unitary shoe counter having self-stiffening properties comprising a textile foundation ply internally impregnated with polyvinyl acetate, a sheet having a single flocked surface on one side and an intermediate layer of latex on the other side of said sheet bonding said sheet to one side of said ply, and a heat activatable layer on the other side of said ply adapted to secure said lining to the outer integument of the upper of a shoe when heated.

7. A formable laminated unitary shoe counter having self-stiffening properties comprising a textile foundation ply internally impregnated with a polyvinyl acetate stiffening compound, a layer of latex having a flocked surface with another surface of said latex layer bonded to one side of said foundation ply and a heat activatable layer on the other side of said foundation ply adapted to secure said lining to the outer integument of an upper of a shoe when heated.

References Cited in the file of this patent
UNITED STATES PATENTS

| | | |
|---|---|---|
| 1,720,764 | Silvester | July 16, 1929 |
| 1,746,249 | Fausse | Feb. 11, 1930 |
| 2,611,726 | Harrison | Sept. 23, 1952 |
| 2,616,821 | Harrison | Nov. 4, 1952 |
| 2,619,441 | Levy | Nov. 25, 1952 |
| 2,684,540 | Levy | July 27, 1954 |
| 2,715,074 | Hirschberger | Aug. 9, 1955 |